United States Patent
Stephens (10) Patent No.: US 7,357,353 B2
(45) Date of Patent: Apr. 15, 2008

(54) METHOD OF JOINING STRUCTURAL ELEMENTS IN AN AIRCRAFT

(75) Inventor: Michael Peter Stephens, Thornbury (GB)

(73) Assignee: Airbus UK Limited, Bristol (GB)

( * ) Notice: Subject to any disclaimer, the term of this patent is extended or adjusted under 35 U.S.C. 154(b) by 350 days.

(21) Appl. No.: 11/016,334

(22) Filed: Dec. 17, 2004

(65) Prior Publication Data

US 2006/0032982 A1 Feb. 16, 2006

(30) Foreign Application Priority Data

Dec. 18, 2003 (GB) .................................. 0329373.5

(51) Int. Cl.
*B64C 1/00* (2006.01)

(52) U.S. Cl. .............................. 244/123.1; 244/123.3; 244/132

(58) Field of Classification Search ............. 244/123.3, 244/123.1, 131, 123.5, 123.2, 132, 123.13
See application file for complete search history.

(56) References Cited

U.S. PATENT DOCUMENTS

| 4,159,552 A | 7/1979 | Berecz |
| 4,556,592 A | 12/1985 | Bannink, Jr. |
| 4,886,407 A | 12/1989 | Harbin |
| 5,037,258 A | 8/1991 | Heurteux |
| 5,171,099 A | 12/1992 | Westre |
| 5,175,665 A * | 12/1992 | Pegg ........................... 361/218 |
| 5,391,028 A * | 2/1995 | Charles ....................... 411/374 |
| 6,457,923 B1 | 10/2002 | Grossman |
| 2003/0205011 A1* | 11/2003 | Bequet ......................... 52/272 |

FOREIGN PATENT DOCUMENTS

| DE | 28 32 098 A1 | 1/1980 |
| EP | 0 425 292 A1 | 5/1991 |
| EP | 0 685 389 A1 | 6/1995 |
| GB | 561627 | 10/1943 |
| GB | 1 224 984 | 3/1971 |
| GB | 2 026 623 A | 2/1980 |
| WO | WO 01/58680 A1 | 8/2001 |

OTHER PUBLICATIONS

Photographs of Westland EH101 Helicopter (undated but admitted prior art).

* cited by examiner

*Primary Examiner*—Timothy D. Collins
(74) *Attorney, Agent, or Firm*—Patterson, Thuente, Skaar & Christensen, P.A.

(57) ABSTRACT

A structure for use on an aircraft and a method of manufacturing said structure. The structure comprises first and second structural elements and a fastening device. The fastening device comprises a bolt that engages with a barrel nut. The first structural element is arranged, in use, to bear loads that are predominantly in a direction that is generally coplanar with the axis of the elongate member. The elongate member extends through the second structural element and ends inside the first structural element.

16 Claims, 7 Drawing Sheets

METHOD OF JOINING STRUCTURAL ELEMENTS IN AN AIRCRAFT

FIELD OF THE INVENTION

The present invention relates to a structure comprising two, joined together, elements of an aircraft and a method of manufacturing such a structure. The invention is of particular application in relation to a structure in an aircraft wing including composite aircraft components that are joined together such that the structure is able to withstand the application of forces in one or more predetermined directions.

BACKGROUND OF THE INVENTION

Aircraft components have, to date, been joined by various techniques, including forming flanges on one or both components such that a nut and bolt may be used as a fastener. Such flanges are commonly provided on ribs within the wing-box of an aircraft to facilitate joining of the ribs to the wing skin. Use of such flanges adds unwanted weight to the aircraft.

Structures on aircraft are subjected, in use, to various forces. As a result of the use of flanges for joining components, forces may not act through the body of a component, but rather be off-set, and thus not fully utilise the inherent strength of the material forming a component.

The shape and configuration of aircraft components and structures may be such that the accessibility of some parts of the components forming the structure may be restricted. The use of nuts and bolts joining flanges of respective components of the prior art may increase assembly time and may require a degree of accessibility that constricts the design of the components.

It is an object of the present invention to provide a method and an apparatus which enables two aircraft components to be joined together which avoids or mitigates one or more disadvantages associated with the above described prior art.

SUMMARY OF THE INVENTION

The present invention provides an aircraft structure comprising first and second structural elements joined by a fastening device, wherein the fastening device comprises an elongate member and a securing member, the first structural element is made at least partly of composite material and is arranged, in use, to bear loads that are predominantly in directions that are generally coplanar with the axis of the elongate member, the elongate member extends through the second structural element, and an end of the elongate member is secured inside the first structural element by the securing member.

Requiring that the first structural element is arranged to bear loads that are predominantly in directions that are generally coplanar with the axis of the elongate member of the fastening device allows the first structural element to bear the loads more directly. It will be understood that the directions of the loads may be parallel. Arranging the elongate member of the fastening device and first structural element in this way allows the inherent strength of the composite material forming the first structural element to be more fully utilised.

The present invention may allow for single-sided assembly of a structure. This may contribute to a reduction in structure assembly time.

The first structural element may be adapted for bearing loads that, in use, are transmitted between the first and second structural elements in the region of the elongate member. Arranging the elongate member and the first and second structural elements in this way allows an efficient transfer, in use, of the predominant loads applied to the structure through the first structural element. The elongate member may for example be arranged along a notional axis that passes through the primary structural load-bearing region of the first structural element.

The first structural element may be strengthened in the region of the elongate member. For example, the first structural element may be locally of greater thickness than elsewhere in the element.

The elongate member preferably comprises a screw thread. The screw thread may actively engage with the first structural element. When the first and second structural elements are assembled, the screw thread may draw the first and second structural elements together. It will be understood that, in contrast, a nail, holding together a first and second structural element by means only of a friction fit, would not actively engage with the first structural element.

The elongate member (which may comprise a screw thread) is preferably a bolt, but may also be a screw and may be a self-tapping screw.

The first structural element may comprise a screw thread. The screw thread may complement the screw thread of the elongate member. The screw thread of the first structural element may be arranged such that it engages with the screw thread of the elongate member. The screw thread of the elongate member may actively engage the screw thread of the first structural element and vice versa. Such an arrangement increases the strength of the join between the first and second structural element.

The elongate member may engage with a barrel nut. The fastening device preferably comprises a barrel nut. The securing member may for example be a barrel nut.

The securing member, for example the barrel nut, is preferably arranged to lie substantially inside the first structural element. The securing member, for example the barrel nut, may be generally elongate and extend in a direction transverse to that of the elongate member of the fastening device. The securing member, for example the barrel nut, may include a surface, defining a hole or passageway, with which surface the elongate member may engage. The surface of the securing member, for example the barrel nut, may include a screw thread.

Barrel nuts (also known as cross dowels) are widely available and are available in a wide range of designs and a number of materials.

Some barrel nuts have been approved for use in the aerospace industry, for example, SL414-4N and SL50B4A, supplied by Shur-Lok Corporation, 2541 White Road, Irvine, Calif., and F52057 and F1800, supplied by Microdot Aerospace Limited, Blackthorne Road, Colnbrook, Slough, Berkshire.

Barrel nuts may be designed such that they are floating or fixed, thus allowing for high or low tolerances, as appropriate, when used in a particular structure in accordance with the present invention. Thus the securing member, for example the barrel nut, may be floating or fixed.

The securing member, for example the barrel nut, may further comprise locating springs. Alternatively or additionally, the securing member, for example the barrel nut, and the first structural element may be so shaped that the orientation of the securing member relative to the first structural element is restricted to aid alignment of the elongate member of the fastening device with the securing member.

The securing member, for example the barrel nut, may comprise a locking mechanism, which may comprise a metallic or polymeric locking mechanism. Inclusion of such a locking mechanism advantageously allows the elongate member to actively engage the securing member (barrel nut) tightly, for example with relatively high frictional forces resisting movement of the securing member (barrel nut) relative to the elongate member. As a result the securing member (barrel nut) is less likely to loosen, for example through vibration, when the structure is in use.

The securing member is preferably accommodated in a machined hole in the first structural element. The machined hole may be formed by drilling.

The present invention has particular application in relation to composite fibre materials.

Advantageously, one, and preferably both, of the first and second structural elements is made at least partly of a composite fibre material. The first and second structural elements may each be made substantially entirely from composite fibre material. Composite carbon fibre and matrix materials are commonly used in aircraft manufacture as they offer a desirable combination of increased strength and comparatively low weight when compared with metals.

As mentioned above, the first structural element may be made substantially entirely from composite fibre material. The first structural element may also include one or more metal elements. The one or more metal elements may be embedded within, or inserted into, the composite carbon fibre and matrix material, preferably as part of the lay up process. The metal elements may be arranged such that the elongate member of the fastening device engages with a metal element. Inclusion of a metal element may increase the strength of the joint formed between the first and second structural elements, for example by providing a region that the elongate member is able in use to grip. The securing member may for example be in the form of such metal element.

The composite fibre material may comprise fibres that are, in use, generally coplanar with the axis of the elongate member. Preferably, the majority of the fibres of the composite fibre material are, in use, generally coplanar with the axis of the elongate member. Preferably, substantially all of the fibres of the composite fibre material are, in use, generally coplanar with the axis of the elongate member. Alignment of fibres such that they are generally coplanar with the axis of the elongate member results in the fibres also being aligned with the predominant loads applied to the structure. Such an arrangement utilises the mechanical properties of the composite material. Such loads may include tensile, compressive, and shear forces. It will be understood that the composite fibre material may comprise layers of fibres, each layer having fibres that extend in a single direction and different layers having different directions. Composite materials comprising continuous fibres, for example, have excellent strength in tension in the direction of the continuous fibres. Moreover, in accordance with this aspect of the present invention, the arrangement of the structure may be such that, in use, loads are predominantly transferred through the composite fibre material in directions in general alignment with the fibres. In prior art proposals, wherein a composite rib is attached to a wing skin by means of a flange on the rib, loads are transferred from the flange into the main body of the rib. The structure of such a prior art rib generally includes, in the region of the flange of the rib, fibres and layers of fibres that extend in a direction transverse to the main load-bearing portion (conventionally referred to as the "web" of the rib) of the rib. Such ribs can be weak at their corners (the region between the web and the flange), because the loads supported by such a rib at the corner can be transverse to the local fibre direction, which can result in local delamination of the layers in the composite material and ultimately failure. Also, by means of the present invention, it is possible to dispense with such flanges entirely, with the consequent savings in weight, cost and assembly time.

One of the first and second structural elements may be made at least partly of metal. One of the first and second structural elements may be made substantially entirely from metal. Traditionally, aircraft structures are made of metal alloys. The present invention can be used to join such metal structural elements.

Preferably, the aircraft structure is so arranged that the joint, between the first structural element and the second structural element, formed by the fastening device is in the form of a T-joint. Thus, at least in the region of the joint between the first and second structural elements, the first structural element may be in the form of a generally elongate structure that extends in a first direction and ends at a surface defined by the second structural element, the surface being transverse (preferably, but not necessarily substantially perpendicular) to the first direction. Substantially the whole of the first structural element may be in the form of a generally elongate structure. The second structural element may, at least in the region of the joint between the first and second structural elements, be in the form of a generally laminar structure. Substantially the whole of the second structural element may be in the form of a generally laminar structure.

The present invention allows the first structural element, for example a spar, rib, or other similar structural element, to be in the general form of a substantially flat plate or bar. When manufacturing aircraft structures, such as, for example, wings, it is necessary to join one aircraft component (which may include or be in the form of the structural element referred to herein) to another, for example, ribs to spars, ribs to wing skin or spar to wing skin, to form a structure. In the prior art, one component is typically manufactured to be C-shaped in cross-section, the C-shaped cross section of the component being defined by two flanges, between which there extends a substantially flat plate. A first component of C-shaped cross-section is typically fastened to a second component by nuts and bolts, or by rivets, that extend through both the second component and a flange of the other component. The present invention enables removal of the flanges from such a component, for example, a spar, rib or other similar structural element, and facilitates the consequent significant weight savings. Thus, preferably the elongate member does not extend from a flange on the first structural element and/or the elongate member preferably does not extend to a flange on the second structural element. For example, the first structural element may include no such flanges. The elongate member may extend through the second structural element from a side of the element to an opposite side.

It will be understood that the invention is of advantage in the case where the structure forms at least part of a construction defining an aerofoil surface. For example, the construction defining an aerofoil surface may be a wing, a fin or a part of a tail-plane. The aircraft structure may be so arranged that, when in situ on an aircraft, the first structural element is positioned on the inside of the aircraft, for example inside a wing. The aircraft structure may be so arranged that, when in situ on an aircraft, the second structural element is positioned on the outside of the aircraft.

The invention is of particular advantage in the case where the structure forms at least part of a wing of the aircraft. The first structural element may be a rib. The first structural element may be a spar. The first structural element may be a stringer. The second structural element may advantageously be a wing skin. The invention thus also provides a wing including a structure, the structure being arranged in accordance with the structure of the aircraft according to any aspect of the invention as described herein.

According to a further aspect of the invention there is provided an aircraft wing comprising a wing skin and a first structural element inside the wing that supports the wing skin, wherein the wing skin is joined to the first structural element by a bolt and barrel nut, the bolt extends through the wing skin and has an end that is secured inside the first structural element by the barrel nut, the first structural element is made at least partly of composite material having layers of fibre material arranged in plies that are generally coplanar with the axis of the bolt.

According to another aspect of the invention there is provided an aircraft wing comprising a wing skin and a first structural element inside the wing that supports the wing skin, wherein the wing skin is joined to the first structural element by a bolt and barrel nut, the bolt extends through the wing skin and has an end that is secured inside the first structural element by the barrel nut, the first structural element is made at least partly of composite material, and the joint between the first and second structural elements is in the form of a T-joint.

According to a yet further aspect of the invention there is provided an aircraft wing comprising first and second structural elements joined by a fastening device, wherein the fastening device comprises an elongate member and a securing member, the first structural element is made at least partly of composite material and is arranged, in use, to bear loads that are predominantly in directions that are generally coplanar with the axis of the elongate member, the elongate member extends through the second structural element, and an end of the elongate member is secured inside the first structural element by the securing member.

The invention also has potential application in relation to other aspects of an aircraft. For example, one of the first and second structural elements may be in the form of a load transferring rod or a part thereof, for example being in the form of a cross brace or a fairing linkage. One of the first and second structural elements may be in the form of a lift device, or a part thereof, for example being in the form of a spoiler, a flap or a slat. One of the first and second structural elements may be in the form of a load pick-up or a part thereof. One of the first and second structural elements may be in the form of an engine mounting means, or a part thereof, for example being in the form of a mounting lug or mounting bracket. One of the first and second structural elements may be in the form of a part of the underlying structure of the aircraft, for example, the structure of the fuselage, the wings, or of the J-box. The aircraft structure may form at least part of the fuselage of an aircraft.

As will be appreciated from above, the present invention can have application in other regions of the aircraft. It will also be appreciated that there may be no need for the fastening device to comprise a securing member. It will also be further appreciated that the present invention can have application where the first structural element does not comprise composite fibre material. Thus, the present invention in accordance with a broadened aspect also provides an aircraft structure comprising first and second structural elements and a fastening device comprising an elongate member, wherein the first structural element is arranged, in use, to bear loads that are predominantly in directions that are generally coplanar with the axis of the elongate member and the elongate member extends through the second structural element and ends inside the first structural element. It will be understood that any of the features described with reference to other aspects of the present invention may be incorporated into this broadened aspect of the invention.

The invention further provides an aircraft including an aircraft structure according to any aspect of the invention as described herein. The structure may form at least a part of a construction defining an aerofoil surface. The structure may of course be provided separately from the aircraft. For example, the structure may be manufactured for the purpose of assembly of an aircraft or part thereof.

According to a further aspect of the invention, there is provided an aircraft including an aircraft structure comprising first and second structural elements joined by a fastening device, wherein the fastening device comprises an elongate member and a securing member, the first structural element is made at least partly of composite material and is arranged, in use, to bear loads that are predominantly in directions that are generally coplanar with the axis of the elongate member, the elongate member extends through the second structural element, and an end of the elongate member is secured inside the first structural element by the securing member.

There is also provided a kit of parts including a first and a second structural element, and a fastening device comprising an elongate member, and preferably a securing member, for building an aircraft structure (for example, a wing) for an aircraft according to any aspect of the invention as described herein.

According to a further aspect of the invention, there is provided a kit of parts including a first structural element made at least partly of composite material and a second structural element, and a fastening device comprising an elongate member and a securing member, the kit of parts being capable of building an aircraft structure, comprising the first and second structural elements joined by the fastening device, in such a way that the first structural element is arranged, in use, to bear loads that are predominantly in directions that are generally coplanar with the axis of the elongate member, the elongate member extends through the second structural element, and an end of the elongate member is secured inside the first structural element by the securing member.

The invention also provides a method of manufacturing an aircraft structure, the method including the step of fastening a first structural element to a second structural element by means of an elongate member that extends through the second structural element, and that has an end that is secured inside the first structural element by means of a securing member, wherein the first structural element is made at least partly of composite material and is arranged for bearing loads that are predominantly in directions that are generally coplanar with the axis of the elongate member. The invention yet further provides a method of manufacturing a structure for use in an aircraft, the method including the step of fastening a first structural element to a second structural element by means of an elongate member that extends through the second structural element and ends inside the first structural element, the first structural element being arranged for bearing loads that are predominantly in a direction that is generally coplanar with the axis of the elongate member.

Of course, it will be appreciated that features described in relation to one aspect of the present invention may be incorporated into other different aspects of the invention. For example, the method of the invention may be performed to produce an aircraft or structure therein or therefor incorporating any of the features of the invention described herein with reference to an aircraft.

BRIEF DESCRIPTION OF THE DRAWINGS

By way of example, embodiments of the invention will now be described with reference to the accompanying schematic drawings, of which.

DETAILED DESCRIPTION OF THE DRAWINGS

Figure 1A:
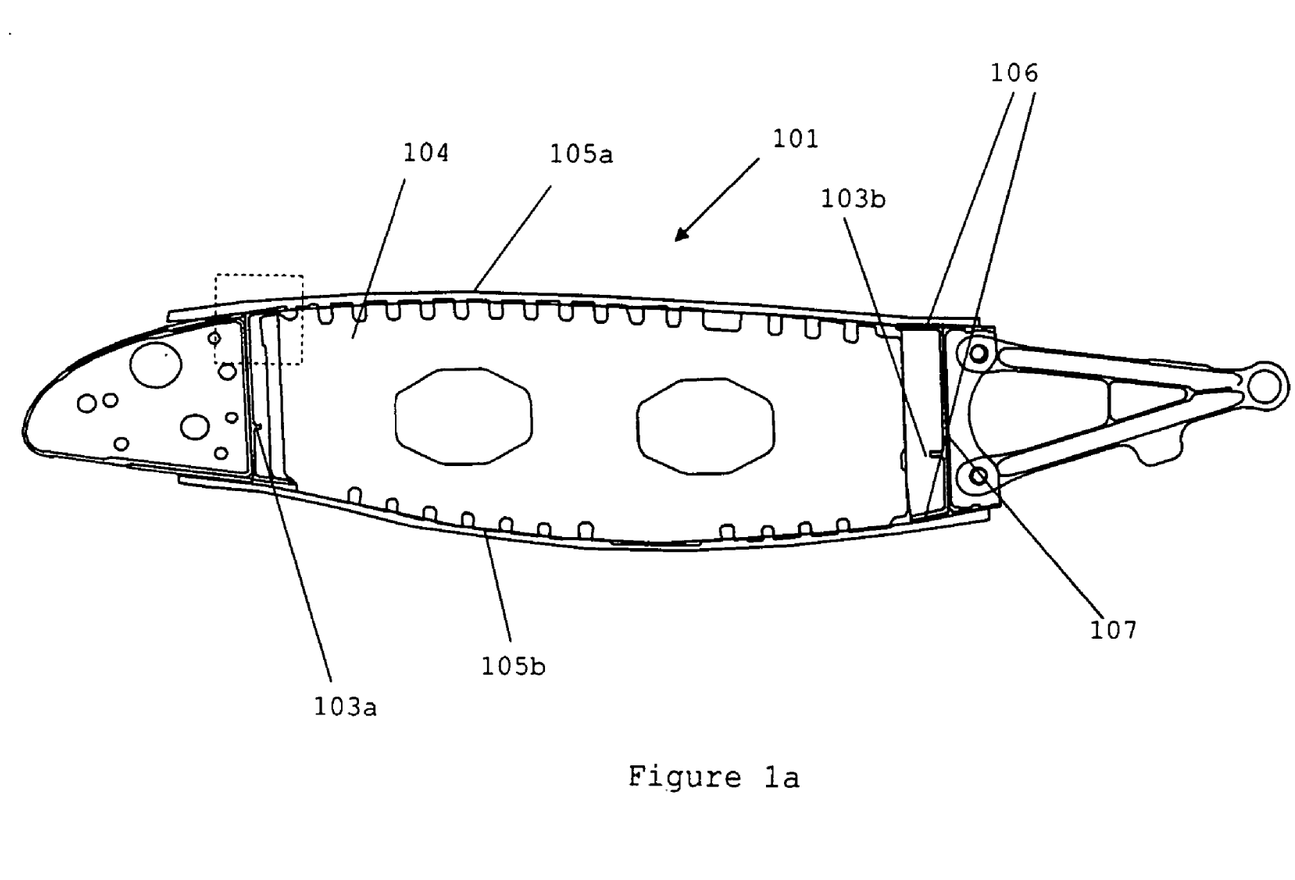
FIG. 1a is a cross-sectional view of a known structure for use in a wing of the aircraft.
Figure 1B:
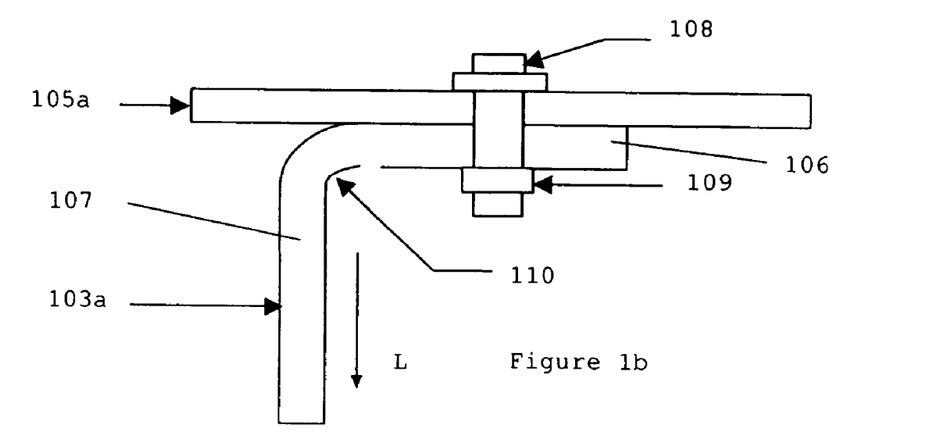
FIG. 1b is a magnified view of a part of FIG. 1a, FIG. 2 is a plan view of an aircraft according to a first embodiment of the invention.

FIGS. 1a and 1b show a cross section of a wing 101 of an aircraft 102 of the prior art. The wing 101 comprises a front wing spar 103a and a rear wing spar 103b that run along the leading and trailing edges of the wing 101. The spars 103 are generally C-shaped in cross section. Ribs 104 are attached to and between the spars 103a, 103b. Attached to the spars 103a, 103b and the ribs 104 are the upper wing skin 105a and lower wing skin 105b. The C-shaped cross section of each spar 103a, 103b is defined by two flanges 106, between which there extends a structural element 107, the flanges 106 each extending from the structural element 107 in a direction that is approximately transverse to the structural element 107.

The spars 103a, 103b and wing skins 105a, 105b are each formed from composite carbon fibre and matrix materials.

FIG. 1b shows a magnified view of a portion of FIG. 1a in the region of the interface between the front wing spar 103a and the upper wing skin 105a. The upper wing skin 105a is fastened to the front wing spar by means of a bolt 108 that extends through both the upper wing skin 105a and a flange 106 of the front wing spar and engages with a nut 109. The front wing spar 103a bears loads predominantly within the plane of the structural element 107, including shear loads and tensile loads in a direction L perpendicular to the flange 106. When subjected to large loads, the front wing spar 103a is prone to failure along a transition 110 formed between the structural element 107 and the flange 106.

Figure 2:
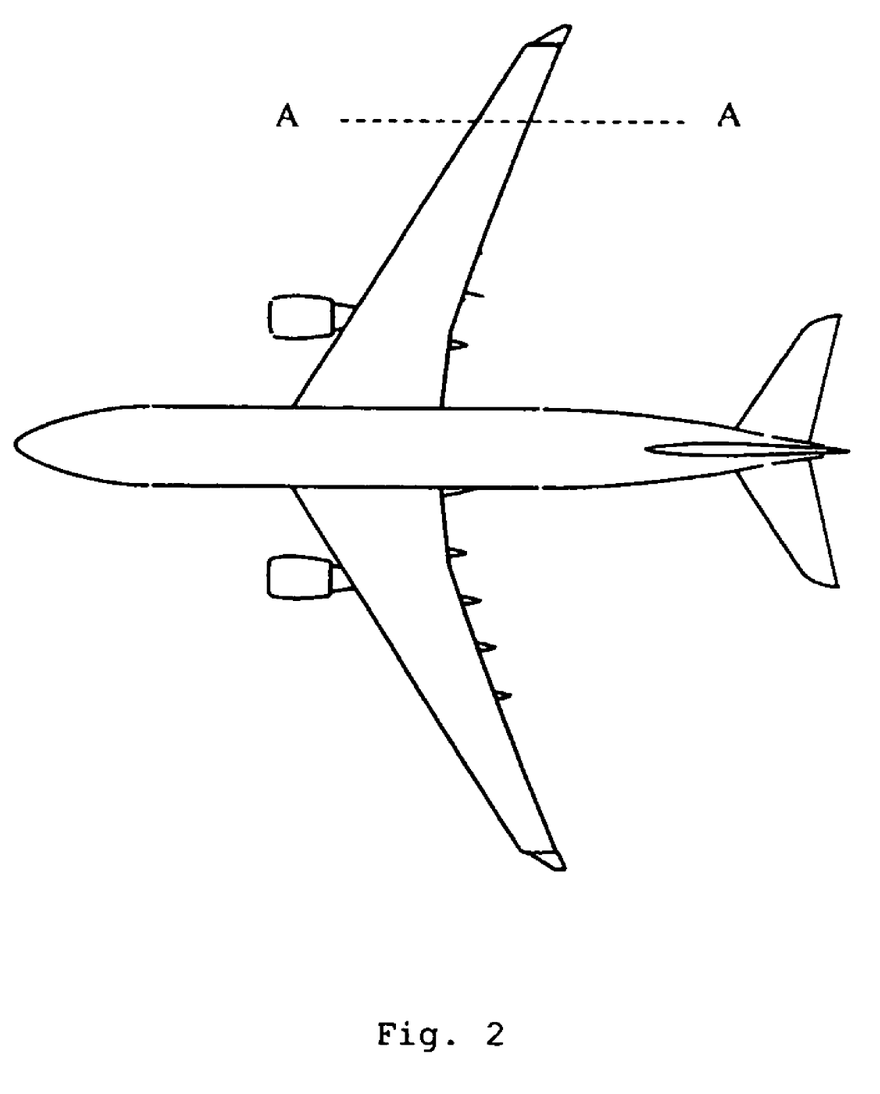
Figure 3:
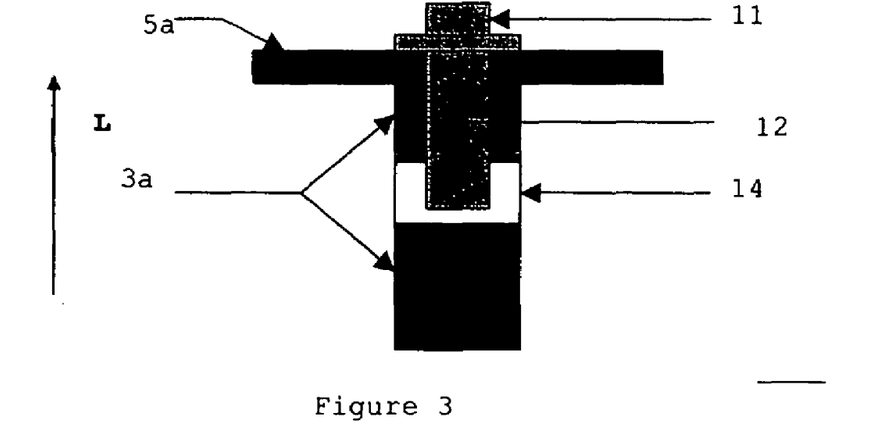
FIG. 3 is a cross-sectional view of a structure of the first embodiment.

FIG. 3 is a cross section taken along the line A-A of the wing 1 of an aircraft 2 shown in FIG. 2 and shows a region of an interface between a front wing spar 3a and an upper wing skin 5a including a structure according to a first embodiment of the invention.

With reference to FIG. 3, the structure comprises a front wing spar 3a, an upper wing skin 5a, and a fastening device 11 comprising a bolt 12. The front wing spar takes the form of a substantially flat plate. The front wing spar 3a is arranged, in use, to bear loads that are predominantly in a directions that are generally aligned with the plane of the spar. The bolt 12 extends through the upper wing skin 5a and ends inside the front wing spar 3a. The front wing spar 3a and front wing skin 105a are formed from a composite carbon fibre and matrix material having plies with fibres in both the +45° and −45° directions (relative to the axis of the bolt 12), the fibres in each ply running in substantially the same direction.

The bolt 12 extends in a direction L, and is arranged along a notional axis that passes through the primary structural load bearing region of the spar, the notional axis being aligned with the plane of the spar. Arranging the bolt 12 and the front wing spar 3a in this way allows an efficient transfer, in use, of the predominant loads applied to the primary structural load bearing region of the front wing spar 3a.

Continuous carbon fibres are used to form the composite material of the front wing spar 3a, the layers of the fibres extending in planes that are generally parallel to the axis of the bolt 12. The spar 3a therefore has excellent strength in tension in the direction L and has good shear strength in shear planes transverse to the plane of the spar. Thus, the predominant loads applied to the structure are transferred through the composite material of the spar 3a in directions within the planes of the fibre layers, thereby facilitating an efficient and direct transfer of the predominant loads applied to the structure through the front wing spar 3a. Also, by way of contrast with FIG. 1b, there is no need for any flanges to be provided on the spar for connecting to the wing skin.

The bolt 12 engages with a barrel nut 14 located within the front wing spar 3a. In the embodiment shown, the barrel nut 14 is generally elongate and extends through the front wing spar in a direction transverse to the length of the bolt 12. The front wing spar 3a may be strengthened by thickening, in the region of the barrel nut 14 as further described in relation to FIGS. 5a-e.

In use, a screw thread (not shown) located on the bolt 12 actively engages with a complementary screw thread (not shown) located on the interior surface of the hole defined by the barrel nut 14. The complementary screw threads act to draw the upper wing skin 5a and the front wing spar 3a tightly together.

Whilst in FIG. 3 (a schematic drawing) the head of the bolt 12 is shown protruding from the upper wing skin 5a, in reality the head is countersunk, and is substantially flush with the upper surface of the upper wing skin 5a.

In order to manufacture the structure of FIG. 3, the front wing spar 3a must be fastened to the upper wing skin 5a by means of a bolt 12 that extends through the upper wing skin 5a and ends inside the front wing spar 3a. The structure shown in FIG. 3 is assembled, on an assembly line, from a single side.

The front wing spar 3a is prepared prior to reaching the assembly line. Prior to assembly, barrel nuts 14 are inserted in a number of drilled holes along the length of the front wing spar 3a, the holes being formed once the front wing spar has been formed.

On the assembly line, the front wing spar 3a and upper wing skin 5a are aligned such that bolts 12 may pass through the respective holes in the upper wing skin. Each bolt 12 thus engages with the barrel nut 14 located within the front wing spar 3a.

A through-thickness sensing alignment method is employed to ensure that the front wing spar and wing skin are suitably aligned. Through thickness sensing uses magnetic fields to line up hole centres. A small, removable, magnet located on the front wing spar 3a may be sensed, using appropriate sensing means, through the upper wing skin 5a. It is particularly effective for the purpose of barrel nut joints as a magnet may be fitted in the region of a hole of the barrel nut 14, with which the bolt 12 is to engage. The accuracy of through thickness sensing is such that it gives tolerances of less than half a millimeter for skin thicknesses under 5 mm.

The spar and the skin are manufactured using existing technologies, but the spar is manufactured in substantially plate like or bar form. The spar need not therefore incorporate any complex geometry such as angles and flanges, which, in view of the fact that the spar is formed form composite carbon fibre and matrix materials, is particularly advantageous.

Figure 4:
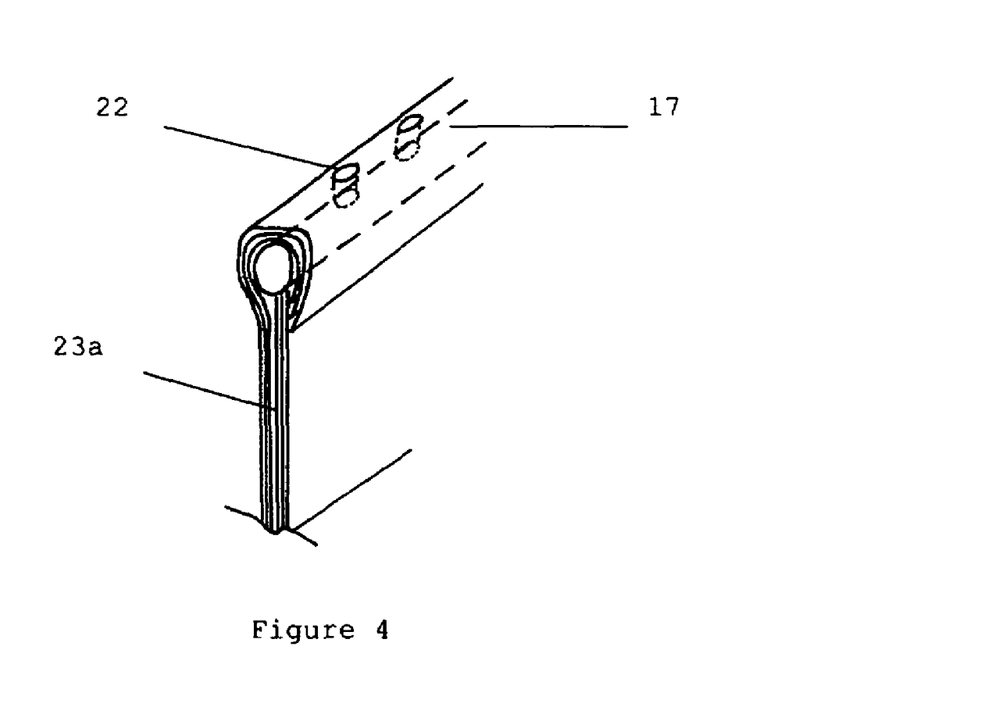
FIG. 4 shows a perspective view of a first structural element for use in a second embodiment of the invention.

A second embodiment of the invention concerning the joining of first and second structural components is illustrated by the component 23a shown in FIG. 4, which component 23a is manufactured to include a solid metal bar 17 that is embedded within the composite carbon fibre and matrix material as a part of the fibre lay-up process. During lay-up, fibre layers wrapped around the bar 17, which has a corresponding increase in weight and lay-up time and a decrease in structural strength in the direction in which the component extends. For this reason, the second embodiment of the invention is preferably not implemented in relation to joining ribs or spars to other components. The metal bar 17 extends along a side of the component 23a and is arranged such that self-tapping screws 22 engage, in use, with the metal bar 17 within the component 23a. The bar 17 thus replaces the barrel nuts 14 of the first embodiment and the screws 22 replace the bolts 12.

Strengths in fibre reinforced composite materials are very high when the fibres are put in tension, but relatively poor when applying a tensile load perpendicular to the plane of the fibre layers. The barrel nut shown in the structure of FIG. 3 is accommodated in a passageway that extends through the front wing spar in a direction generally transverse to the fibre layers. It is possible that the "through-thickness" strength of a laminate composite material in the region of this passageway (housing the barrel nut) would not, in some circumstances, be sufficient to withstand loads the structure is subjected to in use, especially when the spar is subjected to certain shear or torsional loads. FIGS. 5a to 5e each show a cross-sectional view of a first structural element manufactured from composite fibre and matrix material in accordance with further embodiments of the invention. In each case, the first structural element is strengthened in the region of the barrel nut 14 by means of local thickening in the region of the join.

Figure 5A:
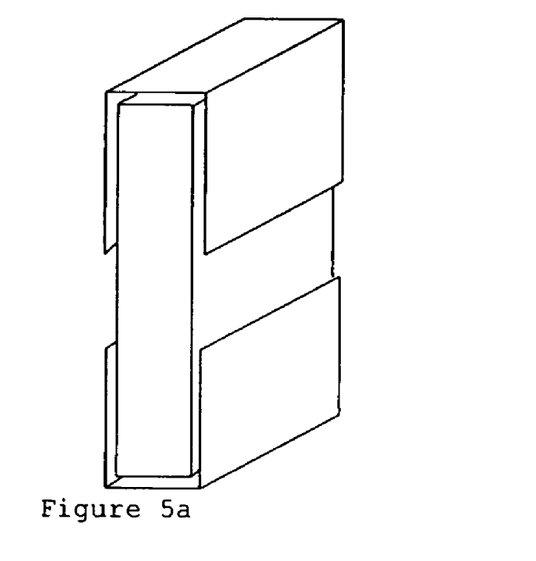
FIGS. 5a-5e show a cross-sectional view of a first structural element for use in further embodiments of the invention.
Figure 5B:
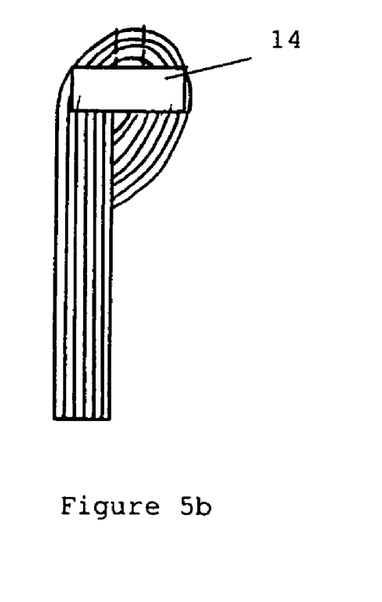
Figure 5C:
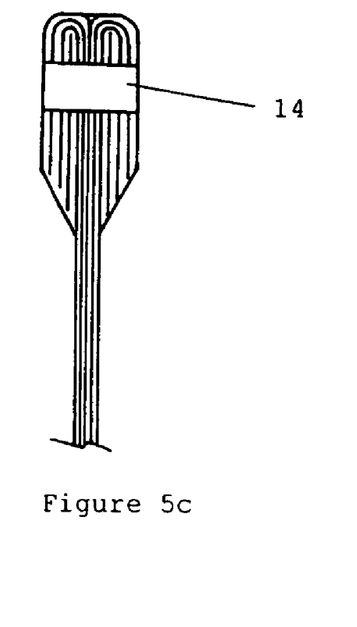
Figure 5D:
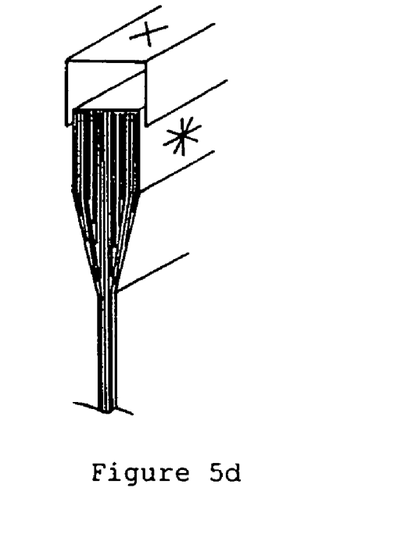
Figure 5E:
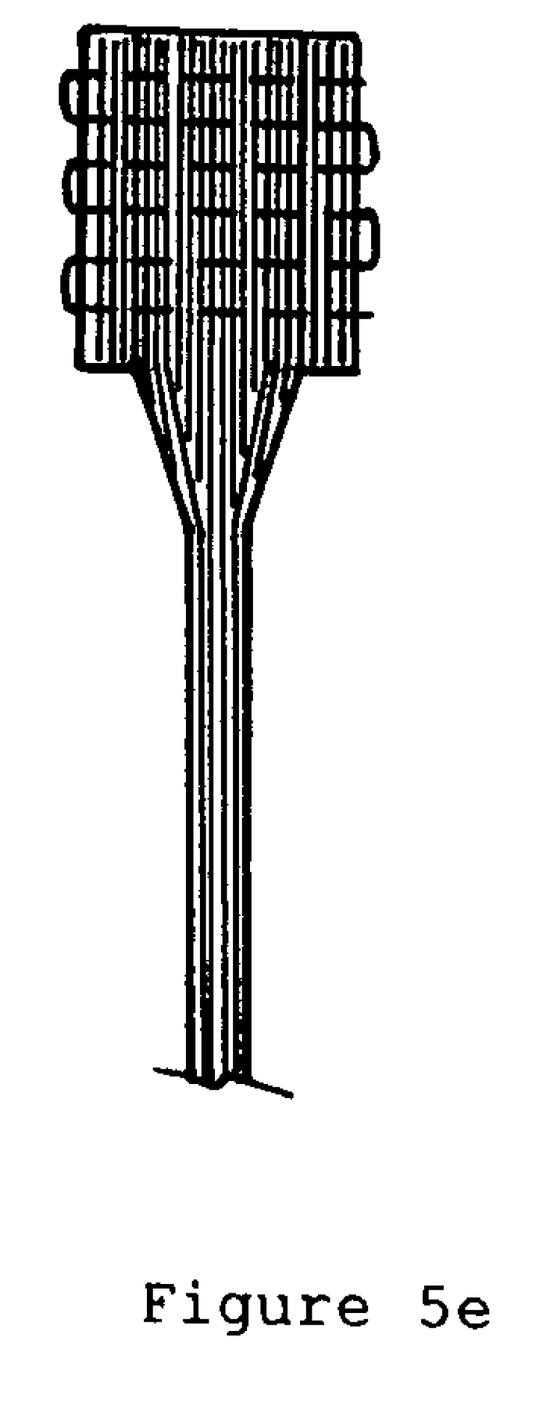

The strengthening may take the form of wrap around ply with fibres orientated at an angle of 45 degrees to the fibres forming the bulk of the first structural element. Such an arrangement is shown in FIG. 5a. Alternatively, or additionally, the fibres forming the bulk of the first structural element may be "wrapped around" the end of the first structural element, as shown in FIGS. 5b-d. Alternatively, or additionally, the first structural element may be reinforced by means of through-thickness stitching, shown in FIG. 5e, preventing the plies from delaminating. Such stitching would take place after lay up of the fibre material, but prior to curing.

Alternatively, the through-thickness strength of the first structural element may be increased by using z-pins or x-pins.

Improving the through-thickness strength of the first structural element results generally in a thickened area in the region of an edge of the first structural element. In addition, sacrificial material may be added during manufacture, such that the structural element may be machined to tolerance prior to assembly of a structure in accordance with the present invention. The addition of sacrificial material reduces the amount of shimming required. In these further embodiments the first structural element is in the form of a rib or a spar in the wing of an aircraft and the bolt (or screw) fixes the element to the wing skin.

It is common to store fuel in a portion of a wing of an aircraft. The invention provides further embodiments, shown in FIGS. 6a and 6b, which allow an efficient method of sealing the join between a rib in the wing to the wing skin so that fuel is unable to pass from one side of the rib to the other side of the rib.

Figure 6A:
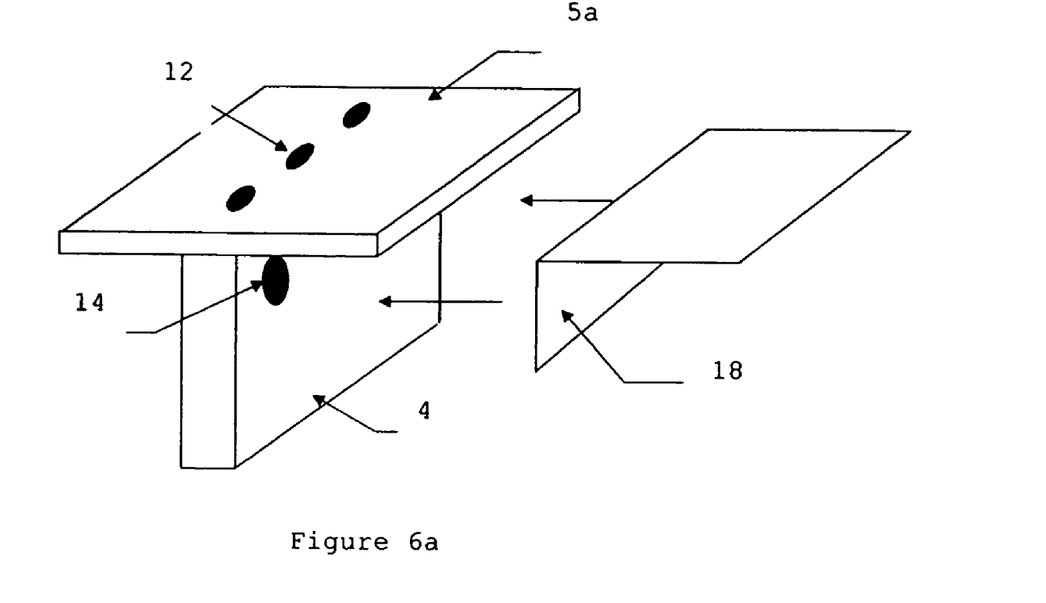
FIGS. 6a-6b show a perspective view of a structure for use in further embodiments of the invention.
Figure 6B:
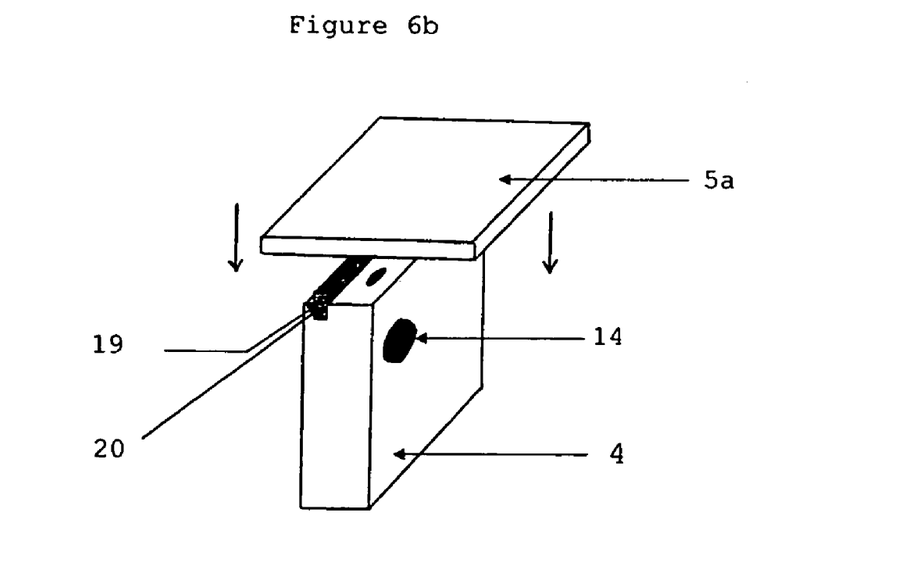

With reference to FIG. 6a, once the rib has been attached to the skin via the bolt and barrel nut an additional ply of fibre material 18 impregnated with matrix material is secured to the rib and skin surfaces, which will on final assembly be positioned in the interior of the wing-box. An alternative, or additional, sealing means is shown in FIG. 6b, which shows a seal 19, that is received in a recess 20 on the surface of the rib that abuts the wing skin. The seal 19 is formed from PTFE. The recess 20 is formed during manufacture of the rib, but could alternatively be machined, post manufacture.

It will be appreciated that various modifications may be made to the above described embodiment without departing from the spirit of the invention.

Various techniques may be employed to ensure that the front wing spar and wing skin are suitably aligned as alternatives to the through-thickness sensing alignment method adopted in the first embodiment. The through-thickness sensing alignment method adopted in the first embodiment may be carried out using a hand held unit to locate the centre of the magnetic field produced by the small removable magnet located on the front wing spar. Alternatively, the alignment method may be automated in accordance with techniques well known in the relevant field.

It is possible to remove and replace bolts that have sheared off whilst still engaged with a barrel nut. The section of bolt engaged with the barrel nut may be drilled out, if necessary using a small metallic collar to get enough purchase on the surface of the bolt section. A thread extractor may then be used to remove the remainder of the bolt.

In relation to the embodiments of FIGS. 6a and 6b relating to the sealing of the join between the rib and the wing skin, it would be possible additionally, or alternatively, to provide an arrangement in which the passageway accommodating the barrel nut 14 does not extend transversely across the entire width of the spar 3. This may be achieved by inserting the barrel nut into a hole that does not extend through the entire width of the spar.

The PTFE seal 19 of FIG. 6b could alternatively be formed of a similar suitable material, such as for example an elastomeric sealing element. In relation to the sealing of the join between the rib and the wing skin, it would be possible to provide an arrangement in which the barrel nut 14 is at least partially encased in a rubber sleeve, thus helping to seal the hole formed in the rib for accommodating the barrel nut.

The invention claimed is:

1. An aircraft structure comprising first and second structural elements joined by a fastening device, wherein
   the fastening device comprises an elongate member and a securing member,
   the first structural element is made at least partly of composite material,
   the elongate member extends through the second structural element,
   an end of the elongate member is secured inside the first structural element by the securing member, the securing member being at least partially embedded within the first structural element; and
   the joint between the first structural element and the second structural element formed by the fastening device is in the form of a T-joint.

2. An aircraft structure according to claim 1 wherein the elongate member comprises a screw thread.

3. An aircraft structure according to claim 1 wherein the elongate member is a bolt.

4. An aircraft structure according to claim 3 wherein the securing member is a barrel nut.

5. An aircraft structure according to claim 1 wherein the securing member comprises a locking mechanism.

6. An aircraft structure according to claim 1 wherein the securing member extends transversely to the elongate member.

7. An aircraft structure according to claim 1 wherein the securing member is accommodated in a machined hole in the first structural element.

8. An aircraft structure according to claim 1 wherein the majority of the fibres of the composite fibre material are, in use, generally coplanar with the axis of the elongate member.

9. An aircraft structure according to claim 1 wherein the first structural element is in the general form of a substantially flat plate or bar.

10. An aircraft structure according to claim 1 wherein the first structural element is selected from the group consisting of a rib, a spar and a stringer.

11. An aircraft structure according to claim 1 wherein the second structural element is a wing skin.

12. An aircraft structure according to claim 1 wherein the first structural element is strengthened in the region of the elongate member.

13. An aircraft wing comprising first and second structural elements joined by a fastening device, wherein
   the fastening device comprises an elongate member and a securing member,
   the first structural element is made at least partly of composite material,
   the elongate member extends through the second structural element,
   an end of the elongate member is secured inside the first structural element by the securing member, the securing member being at least partially embedded within the first structural element; and
   the joint between the first structural element and the second structural element formed by the fastening device is in the form of a T-joint.

14. A method of manufacturing an aircraft structure, the method including the step of fastening a first structural element to a second structural element by means of an elongate member that extends through the second structural element, and that has an end that is secured inside the first structural element by means of a securing member, wherein
   the first structural element is made at least partly of composite material,
   the securing member is at least partially embedded within the first structural element, and the joint between the first structural element and the second structural element formed by the fastening device is in the form of a T-joint.

15. A method according to claim 14 wherein the method includes a step of machining a hole in the first structural element and then inserting the securing member in the hole.

16. An aircraft structure according to claim 1, wherein the T-joint is formed by a part of the first structural element and a part of the second structural element, the part of the first structural element extending substantially perpendicularly from the second structural element.

* * * * *